(12) United States Patent
Liu

(10) Patent No.: US 8,777,685 B2
(45) Date of Patent: Jul. 15, 2014

(54) APPARATUS AND METHOD FOR ASSEMBLING BACKLIGHT MODULE

(75) Inventor: Yong Liu, Guangdong (CN)

(73) Assignee: Shenzhen China Optoelectronics Technology Co., Ltd., Guangdong (CN)

( * ) Notice: Subject to any disclaimer, the term of this patent is extended or adjusted under 35 U.S.C. 154(b) by 302 days.

(21) Appl. No.: 13/378,261

(22) PCT Filed: Nov. 3, 2011

(86) PCT No.: PCT/CN2011/081709
§ 371 (c)(1),
(2), (4) Date: Dec. 14, 2011

(87) PCT Pub. No.: WO2013/023412
PCT Pub. Date: Feb. 21, 2013

(65) Prior Publication Data
US 2013/0044461 A1 Feb. 21, 2013

(30) Foreign Application Priority Data

Aug. 15, 2011 (CN) .......................... 2011 1 0233165

(51) Int. Cl.
G09F 13/04 (2006.01)
(52) U.S. Cl.
USPC .............................. 445/1; 362/97.1; 29/525.11
(58) Field of Classification Search
None
See application file for complete search history.

(56) References Cited

U.S. PATENT DOCUMENTS

| 5,352,294 | A | * | 10/1994 | White et al. | 118/725 |
| 5,540,535 | A | * | 7/1996 | Hamuro et al. | 414/416.04 |
| 5,879,128 | A | * | 3/1999 | Tietz et al. | 414/757 |
| 6,146,504 | A | * | 11/2000 | Patadia et al. | 204/192.12 |
| 6,213,704 | B1 | * | 4/2001 | White et al. | 414/217 |
| 6,676,761 | B2 | * | 1/2004 | Shang et al. | 118/728 |
| 7,418,991 | B2 | * | 9/2008 | Lee et al. | 156/381 |
| 7,999,905 | B2 | * | 8/2011 | Kim et al. | 349/187 |
| 2004/0149228 | A1 | * | 8/2004 | Lee et al. | 118/728 |
| 2004/0250955 | A1 | * | 12/2004 | Blonigan et al. | 156/345.51 |
| 2006/0005770 | A1 | * | 1/2006 | Tiner et al. | 118/728 |
| 2006/0101633 | A1 | * | 5/2006 | Lee | 29/464 |
| 2010/0120320 | A1 | * | 5/2010 | Kim et al. | 445/66 |

* cited by examiner

Primary Examiner — Britt D Hanley
(74) Attorney, Agent, or Firm — Mark M. Friedman

(57) ABSTRACT

The present invention provides an apparatus for assembling a backlight module. The backlight module comprises a first surface, a second surface and side surfaces located between the first surface and the second surface, and the backlight module includes screwing holes. The apparatus comprises: a pallet including at least one opening; a support pillar disposed through the opening; and a retractable control device configured to control the at least one support pillar to protrude with respect to the pallet for supporting the second surface of the backlight module when screwing screws on the first surface and the side surfaces, wherein, when the backlight module is flipped over for screwing on the second surface, the retractable control device is configured to control the at least one support pillar to retract with respect to the pallet. This invention further provides a method for assembling the backlight module.

8 Claims, 2 Drawing Sheets

APPARATUS AND METHOD FOR ASSEMBLING BACKLIGHT MODULE

FIELD OF THE INVENTION

The present invention relates to a field of a liquid crystal display (LCD) technology, and more particularly to an apparatus and a method for assembling a backlight module.

BACKGROUND OF THE INVENTION

In a conventional assembly process of a backlight module, the backlight module is first placed on a pallet, and then a panel is disposed on the backlight module, and then a metal frame covers the panel, and finally the panel and the metal frame are secured on the backlight module by screwing screws to holes of the backlight module.

With the large-size, lightening, thinning, and narrow frame of the LCD, the thickness of the LCD is required to be reduced such that rigidity of the backlight module is reduced resulting in a bending of the backlight module. When a curvature of the bending of the backlight module is too large, the positions of the screwing holes on a front side and sidewalls of the backlight module can not precisely positioned, thereby affecting the screwing thereof. Referring to FIG. 1, in FIG. 1, when positioning screwing holes 12 of the backlight module 11 to screwing holes 14 of the metal frame 13, since the curvature of the bending of the backlight module 11 is too large, the screwing holes 12 can not be positioned to the screwing holes 14.

In the above-mentioned case, the bending backlight module can be precisely positioned by manpower, thus increasing the complexity of the assembly process and deteriorating the production speed. Fixed pillars are capable of supporting the backlight module. However, after reversing the backlight module, the pillars will contact a display area of the LCD. Furthermore, after changing the assembly equipment, it is required to adjust the height of the pillars one by one. This causes a long adjusting time and great difficulty, resulting in low production efficiency.

As a result, it is necessary to provide an apparatus for assembling the backlight module.

SUMMARY OF THE INVENTION

An object of the present invention is to provide an apparatus for assembling a backlight module, so as to solve a conventional problem that, when assembling the backlight module, the support pillars are too high to affect the display area of the flipped backlight module, and the process for adjusting the support pillars is complicated.

For solving the above-mentioned problems, the present invention provides an apparatus for assembling a backlight module, wherein the backlight module comprises a first surface, a second surface and a plurality of side surfaces, and the side surfaces are located between the first surface and the second surface, and the backlight module includes a plurality of screwing holes, and the apparatus comprises: a pallet including at least one opening; at least one support pillar disposed through the opening; and a retractable control device configured to control the at least one support pillar to protrude with respect to the pallet for supporting the second surface of the backlight module when screwing screws on the first surface and the side surfaces of the backlight module; wherein, when the backlight module is flipped over for screwing the screws on the second surface, the retractable control device is configured to control the at least one support pillar to retract with respect to the pallet, and the retractable control device comprises: a compression element configured to control the at least one support pillar to protrude with respect to the pallet, wherein the compression element is a trapezoid block; and an elastic element configured to control the at least one support pillar to retract with respect to the pallet, wherein the elastic element is a spring structure and disposed between the pallet and a position limit bar.

In the apparatus for assembling the backlight module, the support pillar comprises a roller, a position limit bar, a middle pillar and a top bolt, wherein the middle pillar is inserted through the opening of the pallet, and the compression element contacts the roller, and the roller is pivotally connected to the position limit bar, and the position limit bar is connected to the middle pillar, and the top bolt is connected to the middle pillar, and the roller and the position limit bar are disposed at one side of the compression element, and the top bolt is disposed at one side of the backlight module.

Another object of the present invention is to provide an apparatus for assembling a backlight module, so as to solve a conventional problem that, when assembling the backlight module, the support pillars are too high to affect the display area of the flipped backlight module, and the process for adjusting the support pillars is complicated.

For solving the above-mentioned problems, the present invention provides an apparatus for assembling a backlight module, wherein the backlight module comprises a first surface, a second surface and a plurality of side surfaces, and the side surfaces are located between the first surface and the second surface, and the backlight module includes a plurality of screwing holes, and the apparatus comprises: a pallet including at least one opening; at least one support pillar disposed through the opening; and a retractable control device configured to control the at least one support pillar to protrude with respect to the pallet for supporting the second surface of the backlight module when screwing screws on the first surface and the side surfaces; wherein, when the backlight module is flipped over for screwing the screws on the second surface, the retractable control device is configured to control the at least one support pillar to retract with respect to the pallet.

In the apparatus for assembling the backlight module, the retractable control device comprises: a compression element configured to control the at least one support pillar to protrude with respect to the pallet; and an elastic element configured to control the at least one support pillar to retract with respect to the pallet.

In the apparatus for assembling the backlight module, the support pillar comprises a roller, a position limit bar, a middle pillar and a top bolt, wherein the middle pillar is inserted through the opening of the pallet, and the compression element contacts the roller, and the roller is pivotally connected to the position limit bar, and the position limit bar is connected to the middle pillar, and the top bolt is connected to the middle pillar, and the roller and the position limit bar are disposed at one side of the compression element, and the top bolt is disposed at one side of the backlight module.

In the apparatus for assembling the backlight module, the compression element is a trapezoid block.

In the apparatus for assembling the backlight module, the elastic element is a spring structure and disposed between the pallet and a position limit bar.

Another object of the present invention is to provide a method for assembling a backlight module, so as to solve a conventional problem that, when assembling the backlight module, the support pillars are too high to affect the display area of the flipped backlight module, and the process for adjusting the support pillars is complicated.

For solving the above-mentioned problems, the present invention provides a method for assembling a backlight module, wherein the backlight module comprises a first surface, a second surface and a plurality of side surfaces, and the side surfaces are located between the first surface and the second surface, and the backlight module includes a plurality of screwing holes, and the apparatus comprises the following steps: providing a retractable control device, a pallet and a support pillar, wherein the support pillar is disposed through the opening of the pallet; when screwing screws on the first surface and the side surfaces of the backlight module, utilizing the retractable control device to control the support pillar to protrude with respect to the pallet; and when the backlight module is flipped over for screwing the screws on the second surface, utilizing the retractable control device to control the support pillar to retract with respect to the pallet.

In the method for assembling the backlight module, the retractable control device comprises a compression element and an elastic element; wherein the step of utilizing the retractable control device to control the support pillar to protrude with respect to the pallet comprises: utilizing the compression element to control the support pillar to protrude with respect to the pallet; wherein the step of utilizing the retractable control device to control the support pillar to retract with respect to the pallet comprises: utilizing the elastic element to control the support pillar to retract with respect to the pallet.

In the method for assembling the backlight module, the support pillar comprises a roller, a position limit bar, a middle pillar and a top bolt, wherein the middle pillar is inserted through the opening of the pallet, and the compression element contacts the roller, and the roller is pivotally connected to the position limit bar, and the position limit bar is connected to the middle pillar, and the top bolt is connected to the middle pillar, and the roller and the position limit bar are disposed at one side of the compression element, and the top bolt is disposed at one side of the backlight module.

In the method for assembling the backlight module, the compression element is a trapezoid block.

In the method for assembling the backlight module, the elastic element is a spring structure and disposed between the pallet and a position limit bar.

In comparison with the conventional technique, the present invention can solve the conventional problem that, when assembling the backlight module, the support pillars are too high to affect the display area of the flipped backlight module, and the process for adjusting the support pillars is complicated.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention.

Figure 1:
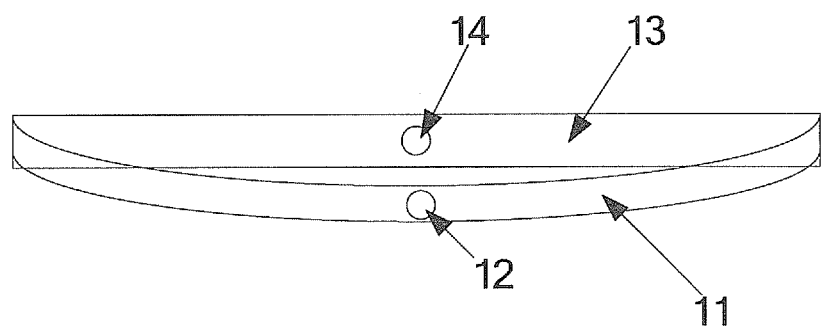
FIG. 1 is a schematic diagram showing a conventional process for assembling a backlight module.
Figure 2:
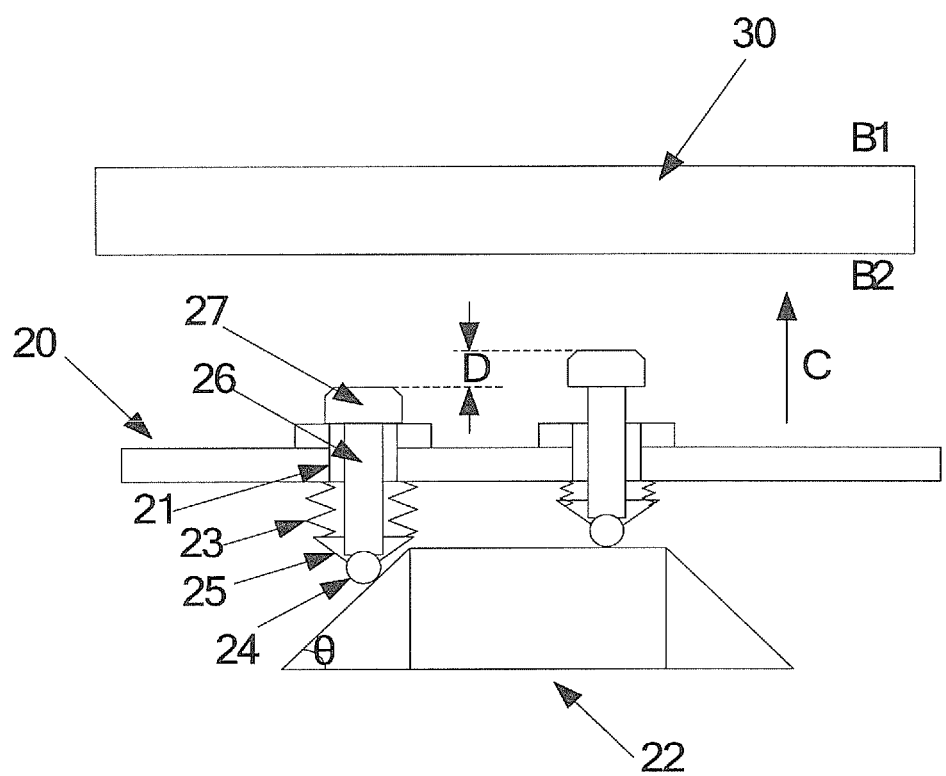
FIG. 2 is a structural diagram showing an apparatus for assembling a backlight module according to the present invention.

FIG. 2 is a structural diagram showing an apparatus for assembling a backlight module according to the present invention.

The backlight module comprises a first surface B1 and a second surface B2. There are a plurality of side surfaces between the first surface B1 and the second surface B2, and there are a plurality of screwing holes (not shown) disposed on the backlight module 30. The apparatus comprises a pallet 20, and the pallet 20 includes openings 21.

The apparatus further comprises support pillars and retractable control devices (not designate), and the support pillars are disposed through the openings.

Referring to FIG. 2 again, each of the retractable control devices comprises a compression element 22 and an elastic element 23. The compression element 22 is configured to control the support pillars to protrude with respect to the pallet 20, i.e. controlling the support pillars to move a predetermined distance D along a predetermined direction C. The elastic element 23 is configured to control the support pillars to retract with respect to the pallet 20 i.e. controlling the support pillars to move the predetermined distance D along a direction opposite to the predetermined direction C. In this case, the predetermined direction C is vertical to the pallet 20.

Referring to FIG. 2 again, each of the support pillars comprises a roller 24, a position limit bar 25, a middle pillar 26 and a top bolt 27. The compression element 22 contacts the support pillars by the roller 24. The roller 24 is pivotally connected to the position limit bar 25. The position limit bar 25 is connected to the middle pillar 26. The middle pillar 26 is inserted through the opening 21. The top bolt 27 is connected to the middle pillar 26.

In this case, the roller 24 and the position limit bar 25 are disposed at one side of the compression element 22, and the top bolt 27 is disposed at one side of the backlight module 30.

In this embodiment, the compression element 22 may be a trapezoid block with a base angle $\ominus$. Certainly, the compression element 22 can be other structures, which are not enumerated here, for controlling the support pillars to protrude with respect to the pallet 20.

Moreover, in this embodiment, the base angle $\ominus$ can be adjustable, and the height of the trapezoid compression element 22 can also be adjustable, thereby making it easier to screw the screws according to different heights of the assembly apparatus.

In this embodiment, the elastic element 23 may be a spring structure and disposed between the pallet 20 and the position limit bar 25. Certainly, the elastic element 23 can be other structures, which are not enumerated here, for controlling the support pillars to retract with respect to the pallet 20.

The assembly process of the apparatus for the backlight module is described below.

When screwing the screws on the first surface B1 and the side surfaces of the backlight module 30, the roller 24 is pushed by the compression element 22, and the position limit bar 25 is pushed by the roller 24, and the elastic element 23 is compressed by the position limit bar 25 and the pallet 20, so as to allow the middle pillar 26 and the top bolt 27 to move the predetermined distance D along the predetermined direction C. At this time, the roller 24 of the support pillar is positioned on a top face of the compression element 22, and the support pillar protrudes with respect to the pallet 20 for supporting the second surface of the backlight module, thereby enhancing the rigidity for assembling the backlight module 30 and preventing the malposition problem when screwing the screws.

After screwing the screws on the first surface B1 and the side surfaces of the backlight module 30, the backlight module 30 is flipped over for screwing the screws on the second surface B2. At this time, the compression of the compression element 22 for the elastic element 23 is released. Therefore, under the elastic action of the elastic element 23, the position limit bar 25 is pushed by the elastic element 23, so as to allow the middle pillar 26 and the top bolt 27 to move the predetermined distance D along the direction opposite to the predetermined direction C. At this time, the roller 24 of the support pillar is not positioned on the top face of the compression element 22, and the support pillar retacts with respect to the pallet 20 for preventing the top bolt 27 of the support pillar from contacting a display area of the backlight module. Furthermore, at this time, the screws have been screwed, and thus ensuring the rigidity of the backlight module 30.

In practice, the assembly for the backlight module 30 can be achieved on a production line, and the apparatus for assembling the backlight module of present invention is moved horizontally on the production line from front to rear. When screwing the screws on the first surface B1 and the side surfaces of the backlight module 30, the compression element 22 is not disposed at the other positions of the backlight module 30 without the need of the support pillar, and thus the top bolt 27 of the support pillar is retracted under the action of the elastic element 23, preventing the top bolt 27 from contacting with the display area of the backlight module 30. More specifically, the compression element 22 is disposed a position for supporting the backlight module 30. That is, at the position with the compression element 22, when the pallet 20 of the present invention for assembling the backlight module, the top bolt 27 is pushed upwardly by the compression element 22.

Figure 3:
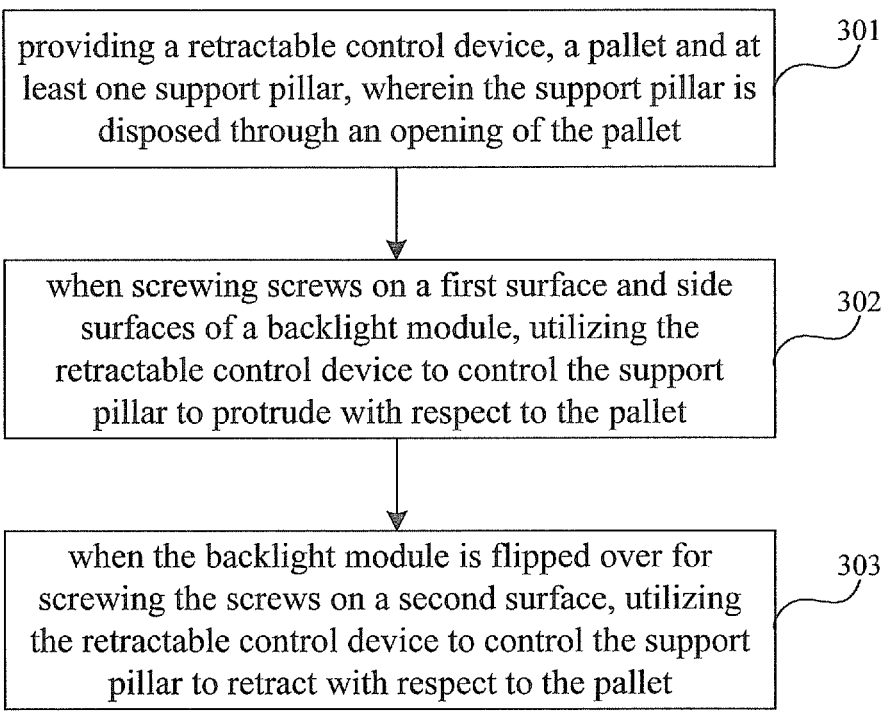
FIG. 3 is a flow diagram showing a method for assembling the backlight module of the present invention.

Referring to FIG. 3, FIG. 3 is a flow diagram showing a method for assembling the backlight module of the present invention.

In a step 301, the retractable control device, the pallet and the support pillar are provided, wherein the support pillar is disposed through the opening of the pallet.

In a step 302, when screwing the screws on the first surface and the side surfaces of the backlight module, the retractable control device is utilized to control the support pillar to protrude with respect to the pallet.

In a step 303, when the backlight module is flipped over for screwing the screws on the second surface, the retractable control device is utilized to control the support pillar to retract with respect to the pallet.

In this case, the backlight module comprises the first surface and the second surface extending along a horizontal direction. There are a plurality of side surfaces between the first surface and the second surface. The backlight module includes a plurality of screwing holes for screwing.

In practice, the retractable control device comprises a compression element and an elastic element. In this embodiment, the compression element controls the support pillar to protrude with respect to the pallet, and the elastic element controls the support pillar to retract with respect to the pallet.

In practice, the support pillar comprises a roller, a position limit bar, a middle pillar and a top bolt, wherein the middle pillar is inserted through the opening of the pallet. The compression element contacts the support pillar by the roller, and the roller is pivotally connected to the position limit bar, and the top bolt is connected to the middle pillar. In this case, the roller and the position limit bar are disposed at one side of the compression element, and the top bolt is disposed at one side of the backlight module.

Preferably, the compression element may be a trapezoid block with a base angle $\ominus$. Certainly, the compression element can be other structures, which are not enumerated here, for controlling the support pillar to protrude with respect to the pallet. Furthermore, the base angle $\ominus$ can be adjustable, and the height of the trapezoid compression element can also be adjustable, thereby making it easier to screw the screws according to different heights of the assembly apparatus.

Preferably, the elastic element may be a spring structure and disposed between the pallet and the position limit bar. Certainly, the elastic element can be other structures, which are not enumerated here, for controlling the support pillars to retract with respect to the pallet.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. An apparatus for assembling a backlight module, wherein the backlight module comprises a first surface, a second surface and a plurality of side surfaces, and the side surfaces are located between the first surface and the second surface, and the backlight module includes a plurality of screwing holes, characterized in that: the apparatus comprises:
   a pallet including at least one opening;
   at least one support pillar disposed through the opening; and
   a retractable control device configured to control the at least one support pillar to protrude with respect to the pallet for supporting the second surface of the backlight module when screwing screws on the first surface and the side surfaces of the backlight module;
   wherein, when the backlight module is flipped over for screwing the screws on the second surface, the retractable control device is configured to control the at least one support pillar to retract with respect to the pallet, and the retractable control device comprises:
   a compression element configured to control the at least one support pillar to protrude with respect to the pallet, wherein the compression element is a trapezoid block; and
   an elastic element configured to control the at least one support pillar to retract with respect to the pallet, wherein the elastic element is a spring structure and disposed between the pallet and a position limit bar.

2. The apparatus for assembling the backlight module according to claim 1, characterized in that: the support pillar comprises a roller, a position limit bar, a middle pillar and a top bolt, wherein the middle pillar is inserted through the opening of the pallet, and the compression element contacts the roller, and the roller is pivotally connected to the position limit bar, and the position limit bar is connected to the middle pillar, and the top bolt is connected to the middle pillar, and the roller and the position limit bar are disposed at one side of the compression element, and the top bolt is disposed at one side of the backlight module.

3. An apparatus for assembling a backlight module, wherein the backlight module comprises a first surface, a second surface and a plurality of side surfaces, and the side surfaces are located between the first surface and the second surface, and the backlight module includes a plurality of screwing holes, characterized in that: the apparatus comprises:
- a pallet including at least one opening;
- at least one support pillar disposed through the opening; and
- a retractable control device configured to control the at least one support pillar to protrude with respect to the pallet for supporting the second surface of the backlight module when screwing screws on the first surface and the side surfaces;
- wherein, when the backlight module is flipped over for screwing the screws on the second surface, the retractable control device is configured to control the at least one support pillar to retract with respect to the pallet;
- wherein the retractable control device comprises:
  - a compression element configured to control the at least one support pillar to protrude with respect to the pallet; and
  - an elastic element configured to control the at least one support pillar to retract with respect to the pallet;
- wherein the compression element is a trapezoid block.

4. The apparatus for assembling the backlight module according to claim 3, characterized in that: the support pillar comprises a roller, a position limit bar, a middle pillar and a top bolt, wherein the middle pillar is inserted through the opening of the pallet, and the compression element contacts the roller, and the roller is pivotally connected to the position limit bar, and the position limit bar is connected to the middle pillar, and the top bolt is connected to the middle pillar, and the roller and the position limit bar are disposed at one side of the compression element, and the top bolt is disposed at one side of the backlight module.

5. The apparatus for assembling the backlight module according to claim 3, characterized in that: the elastic element is a spring structure and disposed between the pallet and a position limit bar.

6. A method for assembling a backlight module, wherein the backlight module comprises a first surface, a second surface and a plurality of side surfaces, and the side surfaces are located between the first surface and the second surface, and the backlight module includes a plurality of screwing holes, characterized in that: the apparatus comprises the following steps:
- providing a retractable control device, a pallet and a support pillar, wherein the support pillar is disposed through the opening of the pallet;
- when screwing screws on the first surface and the side surfaces of the backlight module, utilizing the retractable control device to control the support pillar to protrude with respect to the pallet; and
- when the backlight module is flipped over for screwing the screws on the second surface, utilizing the retractable control device to control the support pillar to retract with respect to the pallet;
- wherein the retractable control device comprises a compression element and an elastic element;
- wherein the step of utilizing the retractable control device to control the support pillar to protrude with respect to the pallet comprises: utilizing the compression element to control the support pillar to protrude with respect to the pallet;
- wherein the step of utilizing the retractable control device to control the support pillar to retract with respect to the pallet comprises: utilizing the elastic element to control the support pillar to retract with respect to the pallet;
- wherein the compression element is a trapezoid block.

7. The method for assembling the backlight module according to claim 6, characterized in that: the support pillar comprises a roller, a position limit bar, a middle pillar and a top bolt, wherein the middle pillar is inserted through the opening of the pallet, and the compression element contacts the roller, and the roller is pivotally connected to the position limit bar, and the position limit bar is connected to the middle pillar, and the top bolt is connected to the middle pillar, and the roller and the position limit bar are disposed at one side of the compression element, and the top bolt is disposed at one side of the backlight module.

8. The method for assembling the backlight module according to claim 6, characterized in that: the elastic element is a spring structure and disposed between the pallet and a position limit bar.

* * * * *